Jan. 8, 1929.

W. O. LYTLE 1,698,371

APPARATUS FOR MAKING COMPOSITE GLASS

Filed March 10, 1927     4 Sheets-Sheet 1

INVENTOR
W. O. Lytle
James C. Bradley

Jan. 8, 1929.

W. O. LYTLE 1,698,371

APPARATUS FOR MAKING COMPOSITE GLASS

Filed March 10, 1927

4 Sheets-Sheet 2

INVENTOR
W. O. Lytle
by
J. C. Bradley
Atty

Jan. 8, 1929.

W. O. LYTLE 1,698,371

APPARATUS FOR MAKING COMPOSITE GLASS

Filed March 10, 1927    4 Sheets-Sheet 3

INVENTOR
W. O. Lytle
by James C. Bradley
atty

Jan. 8, 1929.  
W. O. LYTLE  
1,698,371  
APPARATUS FOR MAKING COMPOSITE GLASS  
Filed March 10, 1927  4 Sheets-Sheet 4
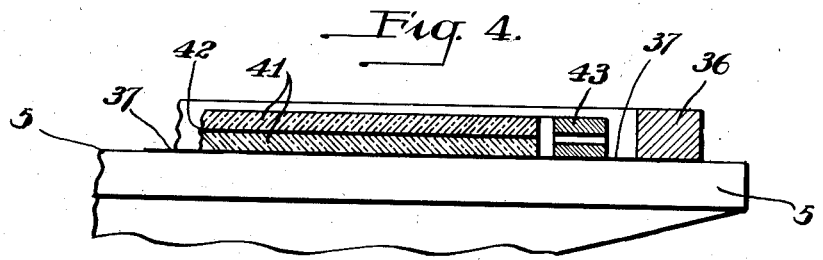
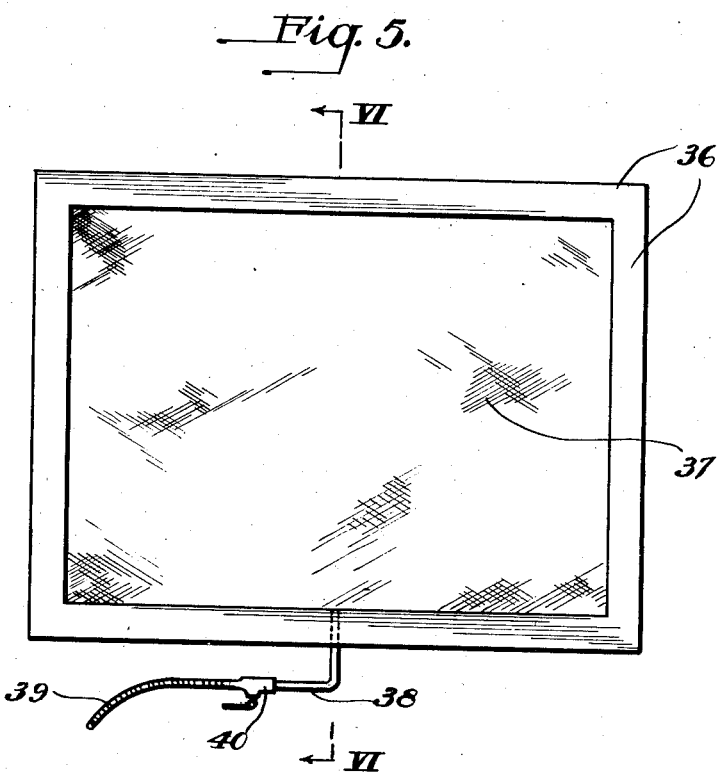
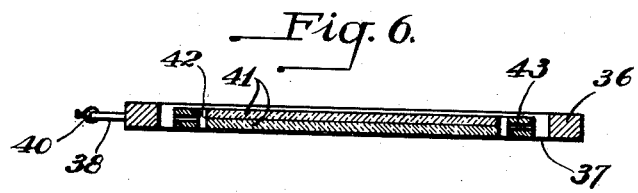
INVENTOR Patented Jan. 8, 1929.

1,698,371

UNITED STATES PATENT OFFICE.

WILLIAM ORLAND LYTLE, OF NEW KENSINGTON, PENNSYLVANIA, ASSIGNOR TO PITTSBURGH PLATE GLASS COMPANY, A CORPORATION OF PENNSYLVANIA.

APPARATUS FOR MAKING COMPOSITE GLASS.

Application filed March 10, 1927. Serial No. 174,237.

Figure 1:
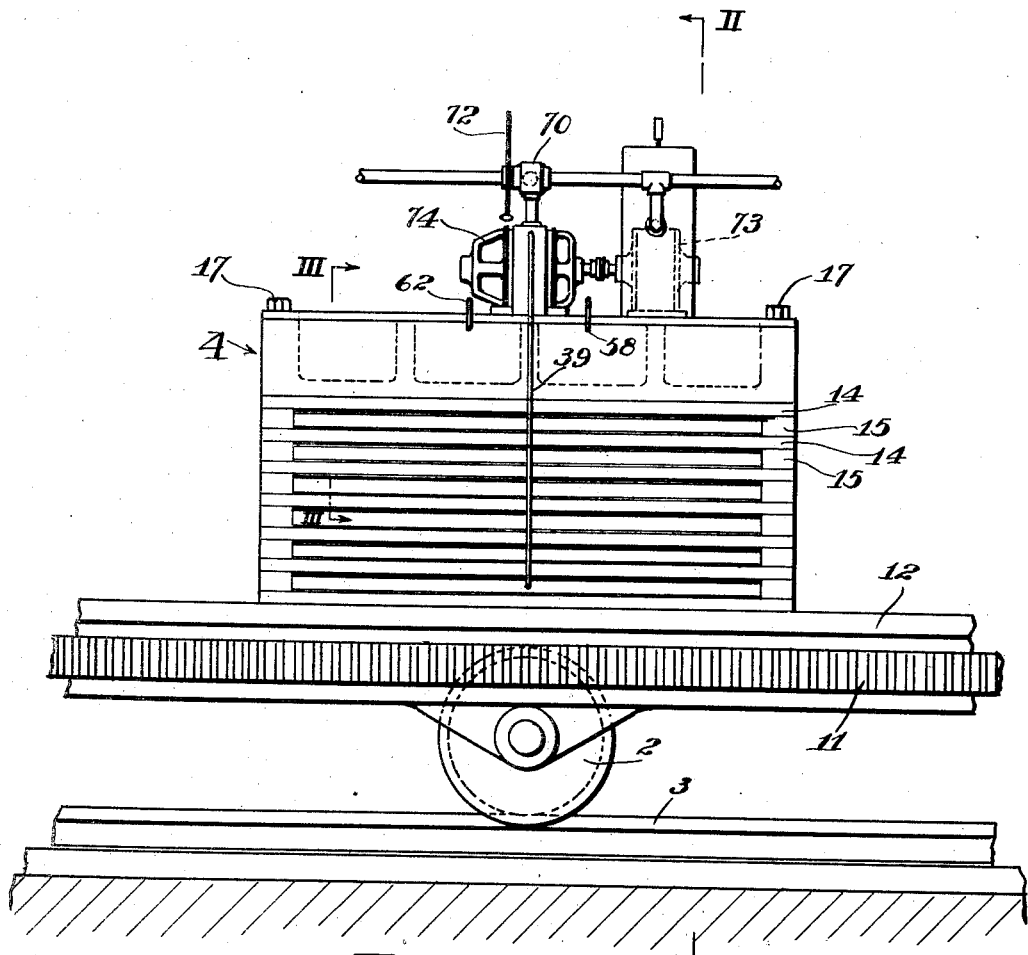
Figure 8:
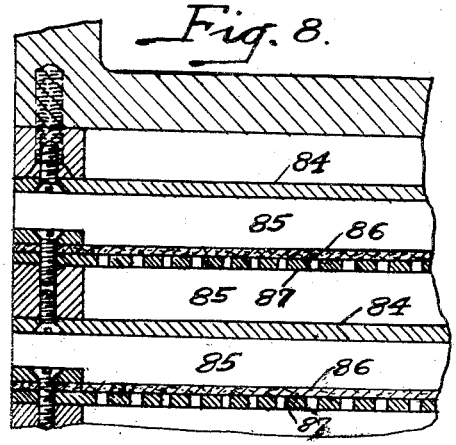
Figure 2:
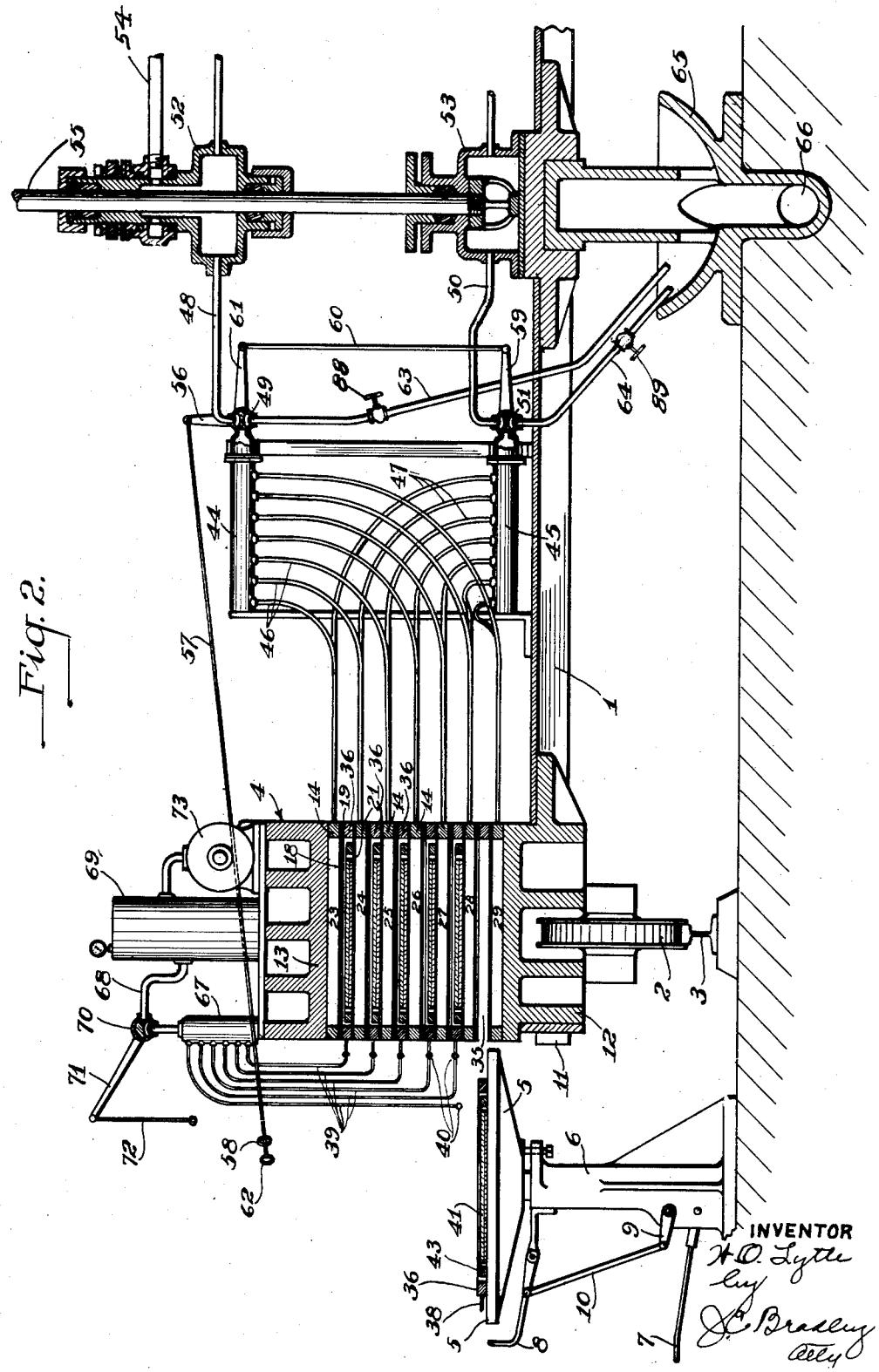
Figure 3:
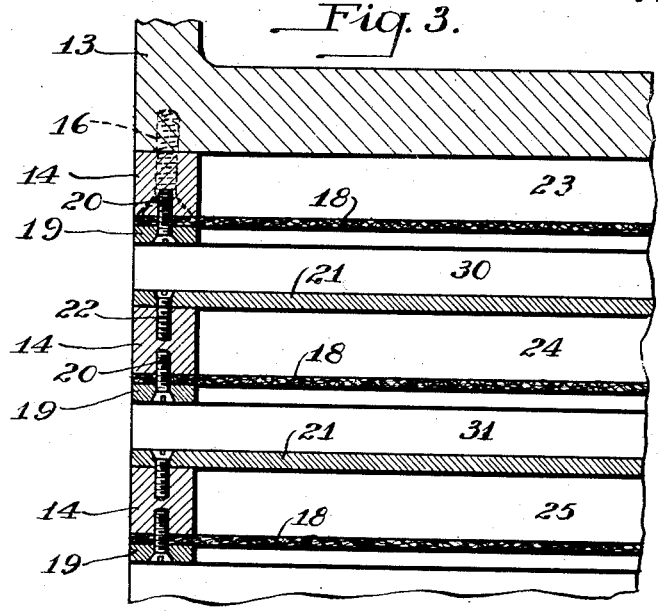
Figure 7:
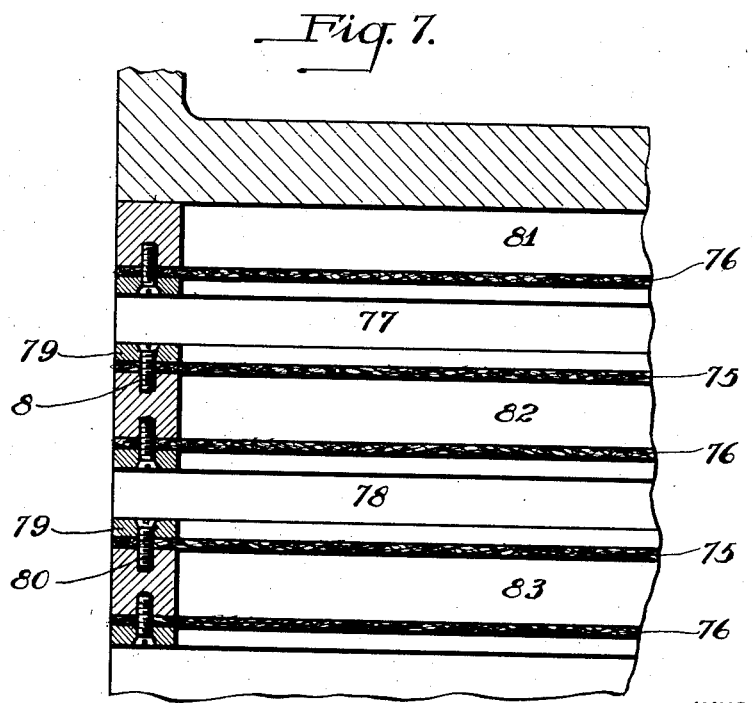

The invention relates to an apparatus for making composite glass, and particularly to the means for applying heat and pressure to cause the joinder between the glass and the reinforcing sheet used therebetween, such sheet ordinarily being of celluloid, although other materials may be used. It is preferred to assemble the sheets with a coating of cement, such as gelatin, dried upon the surfaces of the glass sheets, which are to be cemented to the celluloid, the heat subsequently applied to the assembled sheets serving to soften the gelatin and secure adhesion when pressure is applied, but it will be understood that the apparatus may be used in other ways. For instance, a sufficient amount of heat and pressure will cause the adherence of the celluloid or other reinforcing material to the glass without the use of any cement, and the invention may be employed in such way, if desired. The invention involves a modification of the apparatus shown and described in my pending application, Serial No. 164,511, and is designed to provide an apparatus, which may be more easily and quickly loaded than the form of apparatus heretofore proposed employing diaphragms and rubber bags; which has fewer moving parts; which is more compact; and which is of lighter, less expensive construction. One embodiment of the invention is illustrated in the accompanying drawings, wherein:

Figure 1 is a partial side elevation of the apparatus. Fig. 2 is a section on the line II—II of Fig. 1. Fig. 3 is an enlarged detail section on the line III—III of Fig. 1 with the trays removed. Fig. 4 is an enlarged detail section through one of the trays with a composite sheet therein. Figs. 5 and 6 are detail views of one of the trays, Fig. 5 being a plan view and Fig. 6 a section on the line VI—VI of Fig. 5. Fig. 7 is a section similar to that of Fig. 3 but showing a modified construction. And Fig. 8 is a section through another modification.

Referring to Figs. 1 and 2, 1 is a turntable provided with the wheels 2 mounted upon a circular track 3. This turntable carries a series of cabinets 4, only one of which is shown. Alongside the path of movement of the cabinets is a loading table 5 mounted for vertical movement in the base or standard 6. The table may be moved up and down by any desired means, but this is preferably accomplished by a pawl and rack arrangement operated from the foot pedal 7. By operating this pedal the table may be carried upward step by step past the series of compartments in a cabinet. The table is permitted to move down by gravity under the control of suitable braking devices operated from the hand lever 8, such lever being connected to the dog 9 by means of the link 10. As each cabinet is brought opposite the table, its compartments are loaded with trays carrying the sets of sheets to be joined together. The table also serves for unloading the cabinets after they have made a complete revolution, the composite sheets being removed on to the table, and other trays containing the sets of sheets to be joined together being inserted in the cabinet while the table is maintained in its position opposite one of the compartments. The turntable may be given a step by step movement of rotation to carry the cabinets past the loading table by any suitable means, a rack 11 being shown which is engaged by a reciprocating pawl (not shown).

The castings 12 serve as the bottom members of the series of cabinets, while the ribbed casting 13 constitutes the top of one of the cabinets. Interposed between a bottom member 12 and the top member 13 are the frame members 14, 14, 14, etc., and the spacing strips 15, 15, 15, etc. (Fig. 1.) The top frame member 14 is secured to the casting 13 by means of the stud bolts 16, as indicated in Fig. 3, and the bottom frame member 14 is similarly secured to the bottom casting 12. The other frame members 14 and the interposed strips 15 are secured rigidly in place by means of the vertical stud bolts 17 (Fig. 1), which are screwed at their lower ends into the bottom casting 12. Secured to the lower side of each of the frame members 14 is a flexible diaphragm 18, preferably of rubber, although any form of diaphragm having the requisite flexibility may be employed, such as thin metal plate. These diaphragms are clamped in place by means of the metal strips 19, 19, etc., held in place by means of the screws 20. The frame members lying below the top frame member 14 are each provided with a steel top plate 21, held in place by the screws 22. In this manner the cabinet is provided with the series of pressure chambers 23 to 29, such chambers in each case having a relatively stiff rigid top plate of metal and a flexible bottom plate or diaphragm of rubber, with the frame members 14 acting as the side walls of the chambers. A slot or compartment is also thus provided beneath each rubber diaphragm, and it is in these slots or recesses that the sets of plates to be joined together are placed for the pressing operation. The arrangement thus provides for the pressing of six sets of plates in one cabinet and at one time. From the top of the cabinet to the bottom the compartments are numbered 30 to 35.

In order to position a set of plates in one of the compartments and to remove the set of plates from the compartment, the tray shown in Figs. 4, 5 and 6 is preferably employed. This tray comprises a rectangular metal frame 36 having the bottom 37. Such bottom may consist of a sheet of canvas or of a thin sheet of metal secured at its edges to the frame 36. A handle for sliding the tray into and out of the compartment is provided in the form of the L-shaped pipe 38. This pipe also acts as an exhaust means for applying suction to the compartment in which the tray is placed. In order to perform this function, a flexible tube 39 is connected to the end of the pipe 38 by means of a suitable snap connection 40, the means for applying suction to the tubes 39 being later described. The trays are loaded with the sheets to be joined together, as indicated in Figs. 4 and 6, wherein 41 and 41 are glass plates having a suitable coating of cement upon their inner surfaces, and 42 is a sheet of celluloid which is to constitute the reinforcing for the composite plate. In order to prevent too great pressure being applied to the edges of the sheets, a templet 43 is also placed in the tray surrounding the sheets. Without this templet, the application of pressure, as later described, would tend to squeeze out the celluloid at the edges of the plate. The thickness of the frame 36 is such that it will just fit in between the binding strip 19 (Fig. 3) and the edge of the plate 21. The tray can thus be slid into position without difficulty, but at the same time has a relatively snug fit in the compartment. To load a tray, it is pulled from its compartment onto the loading table 5, as indicated in Fig. 2, and the sheets assembled upon the bottom of the tray with the templet 43 surrounding them. The tray is then slid into the compartment and the table 5 moved upward to a position opposite the next compartment, the operation being continued until all of the compartments are filled with the loaded trays.

Mounted on the turn table opposite each of the cabinets 13 is a hot water supply header 44 and a cold water supply header 45. The compartments 23 to 29 are connected to the hot water header by the flexible pipes 46, 46, 46, etc., and to the cold water header by the pipes 47, 47, 47, etc. The hot water header is supplied by a pipe 48 leading past the three-way valve 49, while the cold water header is supplied by the pipe 50 leading past the three-way valve 51. Hot and cold water are supplied to the headers 52 and 53, respectively, by means of the pipes 54 and 55, the header 52 being swivelled on the pipe 55, and the pipe 55 being swivelled in the header 53. The three-way valve 49 is operated by a lever 56 connected to an operating rod 57 having a handle 58 at its outer end in position to be engaged by the operator at the front of the machine. The valve 51 is operated by the lever 59 connected by the rod 60 to the bell crank lever 61. The bell crank lever 61 has its other arm connected to a rod similar to the rod 57 terminating in a handle 62 adjacent the handle 58. Leading from the valves 49 and 51 are the drainage pipes 63 and 64 which discharge to the basin 65 leading to the pipe 66.

The flexible exhaust pipes 39 heretofore referred to all lead upward to a header 67 connected by the pipe 68 to a vacuum tank 69, a controlling valve 70 being interposed in the pipe 68. This valve is operated by a lever 71 having a depending handle 72 in position to be grasped by the operator. The vacuum tank is connected to a suitable exhaust pump 73 operated from the electric motor 74.

After the cabinet has been loaded with the trays carrying the sets of glass sheets to be joined together as above set forth, a suitable pump connected to the supply pipe 54 is operated to circulate hot water to the header 44 and pressure chambers 23 to 29, such water then being discharged past the valve 51 through the drainage pipe 64. This water is returned to the pump, in order to avoid waste, and the circulation of water is continued until a temperature is attained in the pressure chambers 23 to 29 of approximately 250 degrees F. and until the composite plates in the trays reach approximately such temperature. The pressure is then increased by throttling the outflow through the valve 51 until such pressure in the chambers approximates 150 pounds per square inch. These conditions of temperature and pressure in the chambers 23 to 29 are maintained for a short period, and the temperature in the chambers is then reduced while still maintaining the pressure, as the best results are secured when the plates are cooled off under pressure. In order to secure this result, the valve 49 is turned so that the header 44 is connected with the discharge pipe 63 and the valve 51 is moved from drainage position to admission position. At the same time cold water is pumped under pressure through the pipe 55 to the header 45, such water circulating through the pressure chambers and being conducted to the header 44, from which it is discharged through the drainage pipe 63. The passage through the valve 49 is throttled to such an extent that the desired pressure is maintained in the pressure chambers while the desired reduction in temperature in these chambers is being secured. When the composite plates between the pressure chambers have cooled down to a point where they may be conveniently handled, the circulation of water through the pressure chambers is discontinued, and such chambers partially drained. During the operation as above set forth, the rotation of the turntable has carried the cabinet through approximately one revolution of the table, the other cabinets having been similarly filled and handled as each one passes the loading table 5. When the cabinet again arrives opposite the table 5, the trays are removed one after the other, following the procedure heretofore outlined, the composite plates being removed from each tray and a new set placed in the tray which is put back into the cabinet. In this manner a large number of operations are taken care of with convenience and rapidity, one or two operators only being required to keep the apparatus operating at capacity. The suction apparatus is also operated while pressure is being applied to the plates, this being accomplished by opening the valve 70 to exhaust the air from the spaces carrying the composite plates. This facilitates the removal of any air which is trapped between the glass plates and the celluloid.

Fig. 7 illustrates a modification wherein a series of rubber diaphragms 75, 75, etc. are used in place of the steel plates 21, 21, 21, etc., of the other form of construction. The rubber diaphragms 76, 76, etc. correspond to the diaphragms 18, 18, 18, etc., in the other form of construction. The trays employed are the same as in the other form of construction, but when once positioned in the spaces 77, 78, etc., they do not rest upon the rubber sheets or diaphragms 75, 75, etc., but are supported at their edges upon the binding strips 79 held in place by the screws 80. The operation is the same as in the construction of Figs. 1 to 3, hydraulic pressure being supplied to the chambers 81, 82 and 83. The construction of Figs. 1 to 3 is preferred, because it requires a less number of rubber diaphragms, such rubber diaphragms involving additional expense because of the requirement for replacement from time to time, incident to the deterioration of the rubber.

Fig. 8 illustrates a further modification, in which the metal plates 84 are placed above the spaces 85, and the rubber sheets 86 below such spaces, thus reversing the arrangement of Fig. 3. As the rubber sheets would sag under the weight of the glass, they are supported by the perforated metal plates 87. This modification has one advantage over the Fig. 3 construction in that the rubber plates 18 of the Fig. 3 construction may, in the course of time, sag down somewhat into the spaces 30 and 31, etc. and tend to disarrange the sets of sheets to be joined as the trays carrying them are pushed into the spaces, while the metal plates 84 will maintain their shape without sagging. On the other hand, the plates 21 of Fig. 3 provide a better sliding surface for the trays, than the rubber plates 86 of Fig. 8, and the Fig. 3 structure is simpler, lacking as it does any requirement for plates corresponding to the perforated plates 87.

The method of circulating hot and cold water through the pressure chambers may be modified to suit requirements, and, if desired, the arrangement shown in my pending application, Serial Number 164,511 may be employed. The throttling of the outflowing water through the drainage pipes 63 and 64, in order to secure the necessary pressure in the chambers 23 to 29, may also be accomplished by the use of the separate valves 88 and 89 (Fig. 2). Economy in operation may be increased by keeping the pipes 63 and 64 separate, although for simplicity in illustration, they are shown as both discharging to the same basin 65. It is further possible to reduce the temperature shock to the glass by mixing hot and cold water at the beginning of the heating or cooling operations as applied to the pressure chambers 23 to 29. While the frame members 14, 14, etc. are shown and described as relatively fixed, they may be mounted for relative vertical movement, if desired, as shown in my application above referred to, in order to more easily insert and remove the trays carrying the composite sheets.

What I claim is:

1. Apparatus for applying pressure to a set of sheets to be joined together comprising a relatively fixed plate and frame member spaced apart in opposition to each other, said frame member having a chamber facing said plate, a flexible diaphragm seated across the face of said chamber, a tray between said plate and diaphragm comprising a frame provided with a bottom adapted to carry said sheets, and means for supplying fluid under pressure to said chamber, said plate and frame member being spaced apart just far enough to receive the frame of said tray.

2. Apparatus for applying pressure to a set of sheets to be joined together comprising a relatively fixed plate and frame member spaced apart in opposition to each other, said frame member having a chamber facing said plate, a flexible diaphragm seated across the face of said chamber, a tray between said plate and diaphragm comprising a frame provided with a bottom adapted to carry said sheets, means for supplying fluid under pressure to said chamber, and means for applying suction to the space inside the tray, said plate and frame member being spaced apart just far enough to receive the frame of said tray.

3. Apparatus for applying pressure to a set of sheets to be joined together comprising a relatively fixed plate and frame member spaced apart in opposition to each other, said frame member having a chamber facing said plate, a flexible diaphragm seated across the face of said chamber, a tray between said plate and diaphragm comprising a frame provided with a bottom adapted to carry said sheets, means for supplying fluid under pressure to such chamber, and means for supplying fluid under pressure beneath said plate to support it, said plate and frame member being spaced apart just far enough to receive the frame of said tray.

4. Apparatus for applying pressure to a set of sheets to be joined together comprising a relatively fixed imperforate plate forming the upper wall of a pressure chamber and a frame member spaced apart in opposition to each other, said frame member having a chamber facing said plate, a flexible diaphragm seated across the face of said chamber, a removable tray between said plate and diaphragm comprising a frame provided with a flexible bottom adapted to carry said sheets, and means for supplying fluid under pressure to both of said chambers, said plate and frame member being spaced apart just far enough to permit the frame of said tray to be slid into the slot thus provided.

5. Apparatus for applying pressure to a plurality of sets of sheets to form each set into a composite plate, comprising a cabinet, a plurality of spaced parallel frame members supported therein and each comprising a chamber having an imperforate metal back wall, a flexible front wall or diaphragm, and an edge wall spacing said front and back walls apart, a removable tray in each of the spaces between said frame members, each comprising a frame having a bottom adapted to carry a set of sheets, and means for supplying fluid under pressure to each of said chambers, said frame members being spaced apart just far enough to permit the frames of said trays to be slid into the slots thus provided.

6. Apparatus for applying pressure to a plurality of sets of sheets to form each set into a composite plate comprising a cabinet, a plurality of spaced parallel frame members supported therein and each comprising a chamber having an imperforate metal back wall, a flexible front wall or diaphragm, and an edge wall spacing said front and back walls apart, a removable tray in each of the spaces between said frame members, each comprising a frame having a flexible bottom sheet adapted to carry a set of sheets, and means for supplying fluid under pressure to each of said chambers, said frame members being spaced apart just far enough to permit the frames of said trays to be slid into the slots thus provided.

7. Apparatus for applying pressure to a plurality of sets of sheets to form each set into a composite plate, comprising a cabinet, a plurality of spaced parallel frame members supported therein and each comprising a chamber having an imperforate metal back wall, a flexible front wall or diaphragm, and an edge wall spacing said front and back walls apart, a removable tray in each of the spaces between said frame members, each comprising a frame having a flexible bottom plate adapted to carry a set of sheets, means for supplying fluid under pressure to each of said chambers, and means for applying suction to the spaces inside each of the trays, said frame members being spaced apart just far enough to permit the frames of said trays to be slid into the slots thus provided.

8. Apparatus for applying pressure to a set of sheets to be joined together comprising a plate and frame member spaced apart in opposition to each other, said frame member having a chamber facing said plate, a flexible diaphragm seated across the face of said chamber, a tray between said plate and diaphragm comprising a frame provided with a bottom adapted to carry said sheets, and means for supplying fluid under pressure to said chamber, said plate and frame member being spaced apart so as to receive the frame of said tray.

9. Apparatus for applying pressure to a set of sheets to be joined together comprising a plate and frame member spaced apart in opposition to each other, said frame member having a chamber facing said plate, a flexible diaphragm seated across the face of said chamber, a tray between said plate and diaphragm comprising a frame provided with a bottom adapted to carry said sheets, means for supplying fluid under pressure to such chamber, and means for supplying fluid under pressure beneath said plate to support it, said plate and frame member being spaced apart so as to receive the frame of said tray.

10. Apparatus for applying pressure to a plurality of sets of sheets to form each set into a composite plate, comprising a cabinet, a plurality of spaced parallel frame members supported therein and each comprising a chamber having an imperforate metal back wall, a flexible front wall or diaphragm, and an edge wall spacing said front and back walls apart, a removable tray in each of the spaces between said frame members, each comprising a frame having a bottom adapted to carry a set of sheets, and means for supplying fluid under pressure to each of said chambers, said frame members being spaced apart so as to permit the frames of said trays to be slid into the slots thus provided.

11. Apparatus for applying pressure to a plurality of sets of sheets to form each set into a composite plate, comprising a cabinet, a plurality of spaced parallel frame members supported therein and each comprising a chamber having an imperforate metal back wall, a flexible front wall or diaphragm, and an edge wall spacing said front and back walls apart, a removable tray in each of the spaces between said frame members, each comprising a frame having a flexible bottom sheet adapted to carry a set of sheets, and means for supplying fluid under pressure to each of said chambers, said frame members being spaced apart so as to permit the frames of said trays to be slid into the slots thus provided.

In testimony whereof, I have hereunto subscribed my name this 7th day of February, 1927.

W. ORLAND LYTLE.